United States Patent [19]

Moeltzner

[11] 4,069,530
[45] Jan. 24, 1978

[54] APPARATUS FOR CHAMFERING, POINTING OR THE LIKE OF WORKPIECES HAVING A HEAD OR SHOULDER

[75] Inventor: Wilhelm Moeltzner, Berlin, Germany

[73] Assignee: Angis - Anstalt, Mauren, Furstentum, Liechtenstein

[21] Appl. No.: 734,401

[22] Filed: Oct. 21, 1976

[30] Foreign Application Priority Data

Nov. 14, 1975  Germany .............................. 2551804

[51] Int. Cl.² .............................................. B23G 9/00
[52] U.S. Cl. .............................................. 10/9; 10/21
[58] Field of Search ......................... 10/4, 6, 9, 21, 31, 10/59, 101, 169, 155 R, 155 A

[56] References Cited

U.S. PATENT DOCUMENTS

| | | | |
|---|---|---|---|
| 3,039,181 | 6/1962 | Sawdey ............................ | 10/155 R |
| 3,210,786 | 10/1965 | Moeltzner ........................ | 10/21 |
| 3,226,744 | 1/1966 | Marechal et al. ................ | 10/155 A |
| 3,786,527 | 1/1974 | Morton et al. ................... | 10/169 |
| 3,808,623 | 5/1974 | Matej ............................... | 10/21 |

FOREIGN PATENT DOCUMENTS 388,069  5/1965  Switzerland ........................ 10/21

Primary Examiner—E. M. Combs
Attorney, Agent, or Firm—Max Fogiel

[57] ABSTRACT

An arrangement for chamfering or pointing of cylindrical workpieces having a head or shoulder, in which a rotary table is coaxial with a cutting tool, and has holding units for receiving workpieces and spindles. The holding units have elements with axes parallel to the rotary table axis, and the holding units are mounted in a frame underneath the rotary table. A counter-ring is fixed to the frame and guides the workpieces. An entrainment disk rotates with the table and has holding grooves for shanks of the workpieces. The counter-ring has an upper surface for guiding the heads of the workpieces, whereas the shanks of the workpieces are guided by the holding grooves of the entrainment disk along an inside surface of the counter-ring. The upper surface of the ring is between feed and removal positions for the workpieces, and has at least one plane inclined in the direction of motion of the workpieces when carried by the rotary table for automatic delivery of the workpieces to the cutting tool. In the feed position of the workpieces, the ring has on its upper surface a feed cam with an oblique surface which declines in the direction of the inclined plane of the ring.

10 Claims, 9 Drawing Figures

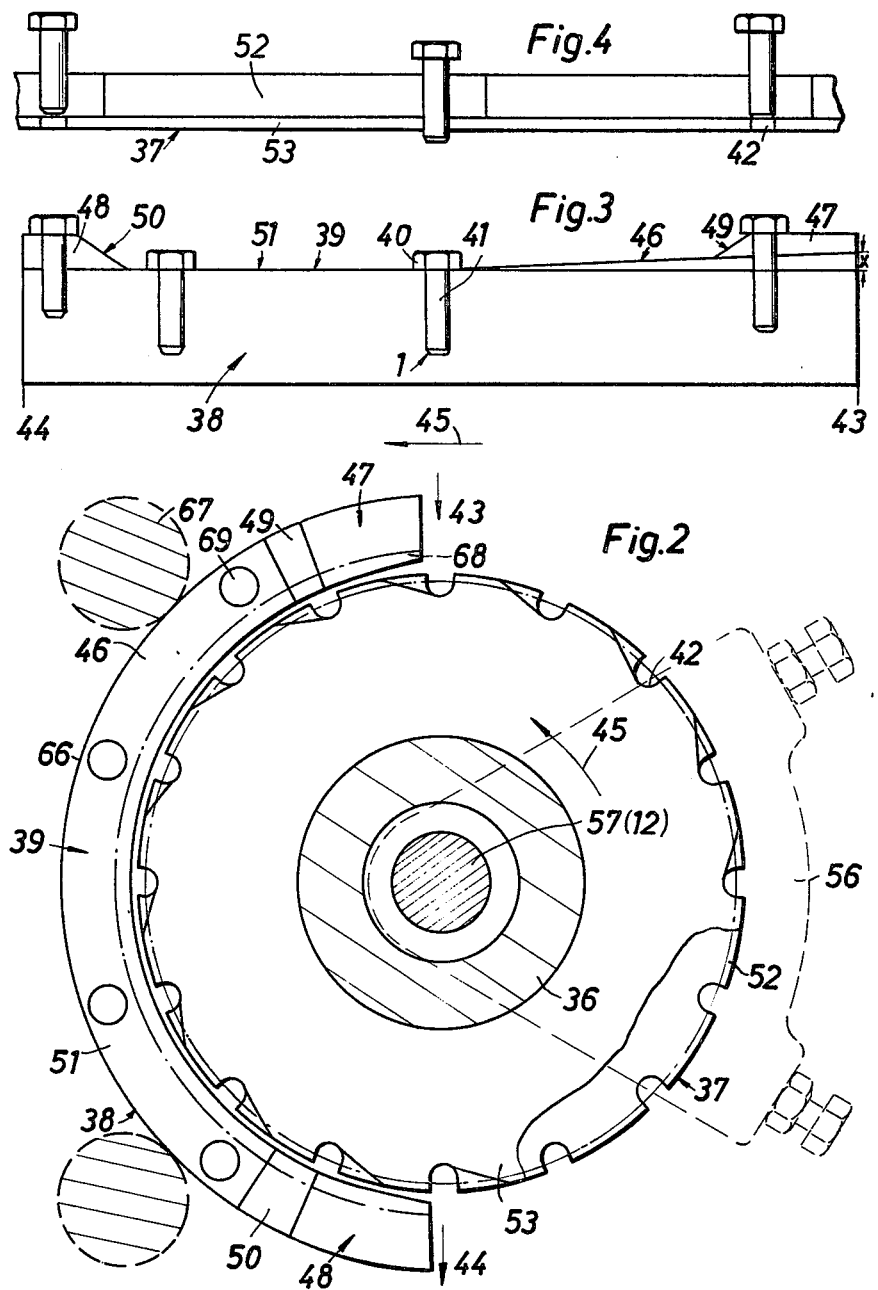

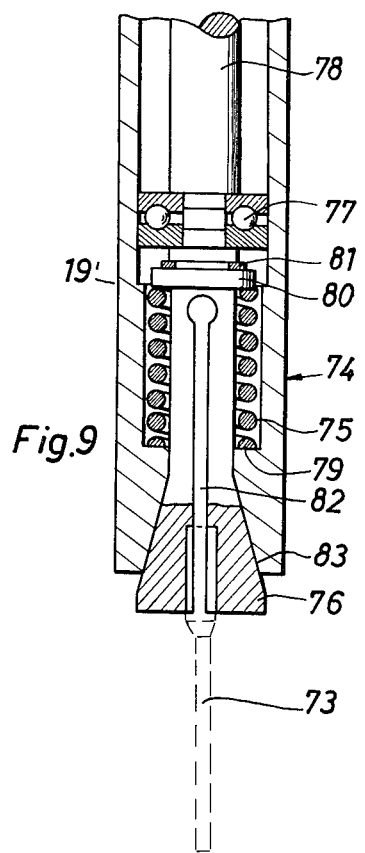

APPARATUS FOR CHAMFERING, POINTING OR THE LIKE OF WORKPIECES HAVING A HEAD OR SHOULDER

BACKGROUND OF THE INVENTION

Arrangement for chamfering, pointing etc. of cylindrical workpieces having a head or shoulder, with a rotary table coaxial with a tool or cutter. The rotary table has workpiece holding units comprising holding elements for the workpieces and spindles. These elements have axes parallel with the rotary table axis (shaft). The workpiece holding units are mounted on the rotary table in a frame. The arrangement further comprises a counter-ring, fixed to the frame, for guiding the workpieces and an entrainment disk rotating with the rotary table, with holding grooves for the shanks of the workpieces.

With known arrangements of this type, the workpiece during machining passes between counter-ring and milling cutter. The entrainment disk has only a transport function. The depth resetting of the workpiece is made via cam controls. These known arrangements, therefore, are too expensive in their design and susceptible to trouble. Also, the attainable surface quality for the surfaces machined on the workpiece, because of the clamping of the workpiece between counter-ring and milling cutter, is not exactly good.

A chamfering device of another type is known. In it, the workpieces delivered to the device are received in the entrainment disk with their axis parallel to that of the milling cutter. They are pressed against a guide track which is eccentric with respect to the milling cutter and is semicircular. The workpieces are rotated by rolling along the guide track while they make a feed-forward movement with respect to the chamfering tool in accordance with the eccentricity of the guide track, so that the workpieces gradually reach the working range of the milling cutter. With this known chamfering device, there is no rotary drive for the individual workpieces so that a rotary motion is imparted to them only by rolling off a counter-ring. With this known device, furthermore, the delivery of the workpieces to the milling cutter must proceed in the axial direction of the workpieces through a control of the rotary table.

It is, therefore, an object of the present invention to provide an arrangement of the above-mentioned type so that delivery of the workpiece proceeds through the guiding device of the workpiece on the counter-ring, and safe insertion of the workpiece in the counter-ring and a very high rotation speed of the workpiece.

Another object of the present invention is to provide an arrangement of the foregoing character which is simple in construction and may be economically fabricated.

A further object of the present invention is to provide an arrangement, as described, which may be readily maintained in service, and which has a substantially long operating life.

SUMMARY OF THE INVENTION

The objects of the present invention are achieved by providing that the upper surface of the counter-ring guides the heads of the workpieces whose shanks are guided in the holding grooves of the entrainment disk along the inside surface of the counter-ring. The upper surface of the counter-ring between the feed and take-away position of the workpieces is provided with at least one surface which is inclined in the direction of motion of the workpieces guided by the rotary table, for automatic delivery of the workpiece to the milling cutter. The workpiece is guided in the radial direction by the holding grooves of the entrainment disk in conjunction with the inside surface of the counter-ring against which the shanks of the workpieces are being pressed. The workpieces are guided in the axial direction, in accordance with the present invention, by the upper surface of the counter-ring along which the head or shoulder of the workpiece is transported. The delivery of the workpiece to the milling cutter proceeds through the inclined plane in the upper surface of the counter-ring which provides the workpiece with an exact measure for delivery to the milling cutter. The present invention has simplified the construction of the individual workpiece holding units. During the machining phase, no control of delivery is required. The counter-ring has a semi-circular shape. Depending on the location of the feed and take-away positions, the counter-ring may also enclose a larger or smaller part of the circumference of the entrainment disk.

The present invention further provides that the counter-ring in the feed position of the workpiece has a feed cam with an oblique surface which drops in the direction of the inclined plane of the counter-ring. The upper surface of the feed cam facilitates easy insertion of the workpiece in the arrangement. The oblique surface which drops in the direction of motion of the workpiece makes possible simple transfer of the workpiece to the upper surface of the counter-ring, which surface acts as reference surface during the machining of the workpiece. In accordance with the present invention, the counter-ring may have another cam with an oblique surface on its upper surface in the take-away position. This oblique surface rises in the direction of motion of the workpiece from the upper surface of the counter-ring. This additional cam facilitates a vertical movement of the workpiece from the milling cutter and easy removal of the workpiece whose head rests against the upper surface of the cam in the take-away position.

In another embodiment of the present invention, the counter-ring has a plane surface for finish machining of the workpiece between the end of the inclined plane and the cam in the take-away position.

In another embodiment, the semicircular holding grooves of the entrainment disk are provided in the upper region with milling cuts which, at the topside of the entrainment disk extend tangentially in the direction of rotation of the entrainment disk and in the lower region of the entrainment disk pass continuously into the semicircular groove shape. This construction of the entrainment disk, which is used particularly for workpieces with short shank, makes possible easy insertion of the workpiece shanks in the semicircular holding grooves. In another embodiment of the present invention, the entrainment disk for longer workpiece shanks comprises two disks on top of each other; the lower disk has semicircular holding grooves and the upper disk has holding grooves with tangential milling cuts in the direction of rotation. The two disks of the entrainment disk are advantageously provided with as great an axial spacing as possible so that the shank of the workpiece to be machined projects beyond the lower disk by the minimum amount required for machining.

By machining the workpieces in only part of the circumference of the counter-ring, the entire rotary table is loaded very one-sidedly.

Another embodiment of the present invention provides that the shaft of the rotary table has a spring-elastic supported reset device which engages the shaft of the rotary table immediately above the milling cutter and whose line of action is directed approximately towards the center of the machining region of the counter-ring.

In order to obtain maximum speed for the workpieces during machining, another embodiment of the present invention for an arrangement of the above type with a rotary drive for the rotary table, provides an additional drive for the spindles of the workpiece holding units located in the rotary table. This drive may comprise pinions assigned to each spindle and a gear meshing with these pinions. The gear is mounted on the non-rotating shaft of the rotary table and can be rotated via a drive which again may be driven by the rotary drive for the rotary table. This construction makes possible a very high speed for the spindles of the workpiece holding units.

In a particularly preferred embodiment of the arrangement, where the upper surface of the counter-ring is parallel to the counter-ring base surface resting on the surface of the frame, the counter-ring base surface, through intermediate layers, makes an angle with the surface of the frame and the upper counter-ring surface itself constitutes the inclined plane of the counter-ring. Through this embodiment, the slope of the inclined plane of the counter-ring can be easily adjusted for varying depth resets of the workpieces, requiring only that intermediate layers must be located between the counter-ring base surface and the frame surface; these layers are disks (washers) in the area of the mounting screws. In a preferred embodiment, the rearside of the counter-ring, for centering, is held by columns which are solidly connected to the frame. Preferably, one uses two columns 90° apart, with respect to the axis of rotation of the arrangement. The columns support the counter-ring, simultaneously centering it. In a further embodiment, the upper surface of the counter-ring, as guide surface for the workpieces, may have a raised edge strip.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompany drawings.

BRIEF DESCRIPTION OF THE DRAWING

FIG. 2 shows a top view of the dog (or entrainment) plate and the counter-ring in the direction of arrow II—II in FIG. 1;

FIG. 3 shows a side view of a development of the counter-ring;

FIG. 4 shows a side view of a development of the entrainment disk;

FIG. 9 shows a vertical section through the holding head of the workpiece holding units for holding a flat head screw bolt.

DESCRIPTION OF THE PREFERRED EMBODIMENTS

Figure 1:
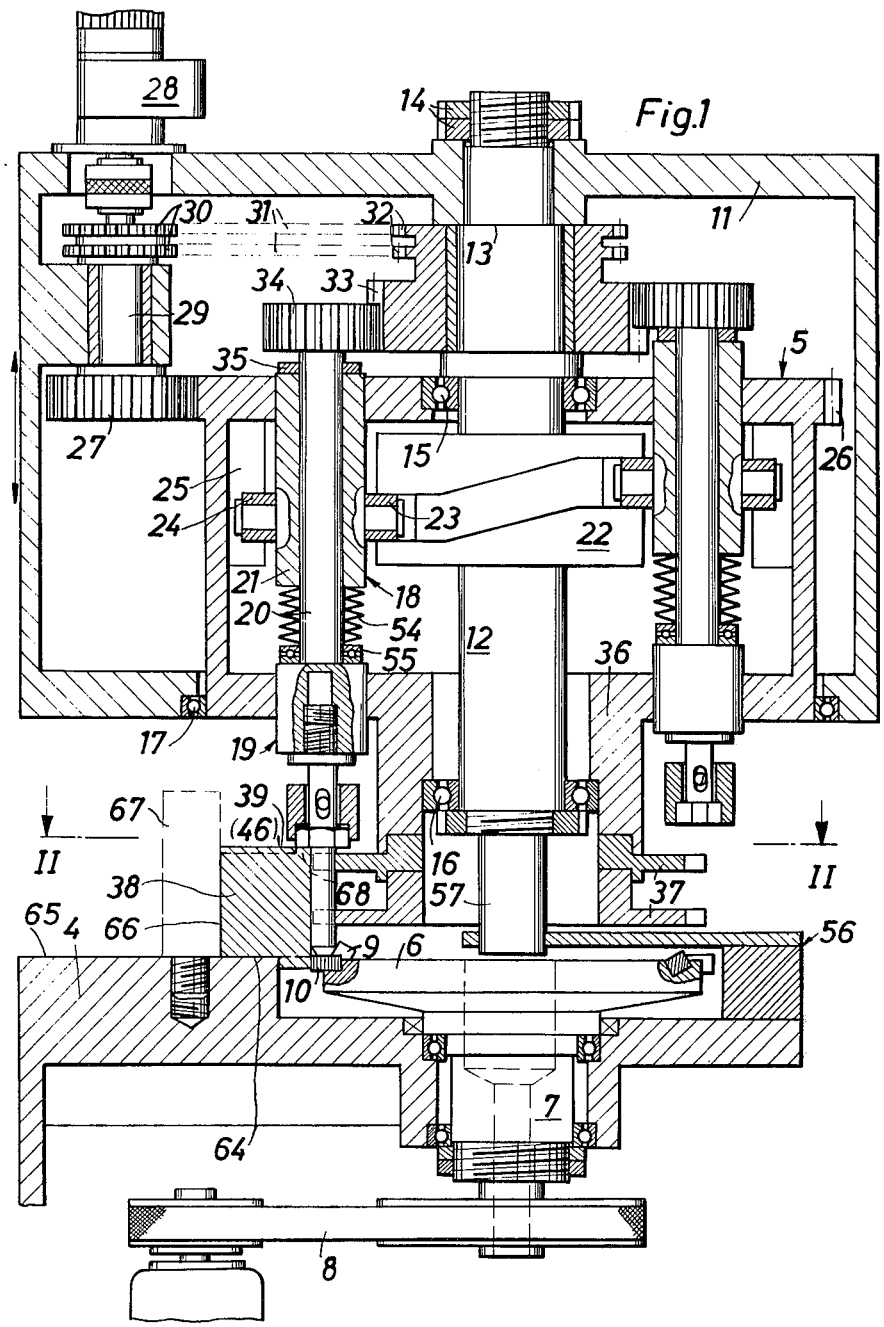
FIG. 1 shows a vertical sectional view through the arrangement of the present invention.

The arrangement for chamfering, pointing etc. of cylindrical workpieces 1, 2, 3 having a head or a shoulder comprises a frame 4 constituting a machine tool table and a vertically movable rotary table 5 for holding the workpieces 1, 2, 3. The arrangement can be alternately used as an intermediate arrangement for two special machines or as an independent special machine.

Frame 4 holds a tool or milling cutter 6 which rotates about its axis 7. Cutter 6 is driven via a motor driven belt drive 8. The shaft 7 mounting cutter 6 has a hollow bore as shown by the broken line in FIG. 1. The cutter 6 in the embodiment shown alternately, has a cutting edge 9 for the bottom surface of the workpiece 1, 2, 3 and a cutting edge 10 for the chamfer of workpiece 1, 2, 3. Such a milling cutter is commercially available.

The rotary table 5 rotates inside a housing 11 which can be moved and adjusted in a vertical direction (not shown in detail). For mounting the rotary table 5, the housing 11 has a support shaft 12 whose shoulder 13 rests against an opening in the housing and is fixed in housing 11 by means of two shaft nuts 14. The rotary table 5 is supported at its upper end on support shaft 12 by a radial bearing 15. At this bottom end, the rotary table is supported on support shaft 12 by means of an additional radial bearing 16. For further support, the rotary table in the area of its lower end has another radial bearing 17 which is located in an annular groove of housing 11.

The rotary table 5 carries several workpiece holding units 18 which are arranged on a concentric circle about the support shaft 12. The workpiece holding units 18 comprise holding heads 19 and spindles 20 plus guide sleeves 21 in which the spindles rotate. The guide sleeves 21 and part of the holding heads 19 can slide vertically within the upper and lower boundary plates of rotary table 5. The vertical motion proceeds via a cam control which comprises a cam drum 22, mounted on support shaft 12, and rollers 23 sliding along the cam; these rollers are rigidly connected to the guide sleeves 21. Rollers 24 fastened further out to the guide sleeves 21, slide in guide slots 25 which are located inside the rotary table 5 and prevent rotary motion of guide sleeves 21.

The rotary table 5 has an external gear rim 26 which meshes with a drive pinion 27 mounted in housing 11, and is driven via a drive unit 28 which is attached to housing 11. Drive unit 28 drives a pair of gears 30 which is mounted on shaft 29 of drive pinion 27. The gear pair 30, via a chain drive, drives another gear pair 32 which is mounted and rotates on support shaft 12. The gear pair 32 is rigidly connected to a gear pair 33 which is also mounted in rotary fashion on support shaft 12 and which meshes with pinions 34. These are rigidly connected to spindles 20 of workpiece holding units 18. Since the workpiece holding units 18 are vertically displaceable, pinions 34 are also displaceable in relation to gear 33. Between each pinion 34 and the associate guide sleeve 21, there are thrust washers 35. Through this arrangement, the spindles 20 of the workpiece holding units 18 and hence the holding heads 19 receive an additional driving which is provided in addition to the rotary drive by the gear pair 26, 27 for the rotary table.

The speed of workpieces 1, 2, 3 which is very important for machining the workpieces by means of milling cutter 6, can be adjusted to an expedient machining speed by merely changing gear pair 30.

The rotary table 5 at its lower cylindrical shoulder 36 has a dog (or entrainment) disk 37 which is associated with a counter-ring 38 screwed to the frame 4 and surrounding the dog plate (or disk) 37 along a semicircle, as shown in FIG. 2. The upper surface 39 of counter-ring 38 is provided to guide the heads 40 of workpieces 1, 2, 3. Their shanks 41 are carried in holding grooves 42 of the entrainment plate. The counter-ring 38 extends from a feed position, denoted by arrow 43, for the workpieces in a semicircle around the entrainment plate 37 up to the take-away position, denoted by arrow 44, for workpieces 1, 2, 3. Between these two positions, the upper surface 39 of the counter-ring 38 has a plane 46 which is inclined in the direction of motion (arrow 45) of workpieces 1, 2, 3 carried by rotating table 5, for automatic delivery of workpieces 1, 2, 3 to milling cutter 6. In the feed position 43 and the take-away position 44, the counter-ring 38 has cams 47 and 48 which have inclined planes 49 and 50, respectively. The inclined plane 49 drops in the direction of motion of the workpieces 1, 2, 3 towards inclined plane 46, whereas inclined plane 50 rises in the direction of motion of workpieces 1, 2, 3. Accordingly, workpieces 1, 2, 3 are lowered or lifted. Between the end of the inclined plane 46 and the cam 48 in the take-away position 44, the upper surface 39 of the counter-ring 38 has a level surface 51 for finishing workpieces 1, 2, 3. (FIG. 3).

Figure 5:
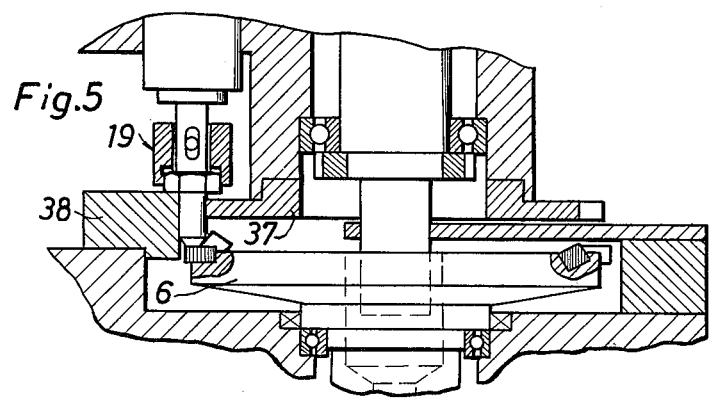
FIG. 5 shows a detail of FIG. 1 for machining hexagonal screw bolts with short shanks.

The entrainment disk 37, shown in FIG. 5, comprises two disks 52, 53. Of these, the lower disk 53 has holding grooves 42 which are semicircular and extend to the outside by a certain amount with rectilinear sidewalls. On the other hand, the upper disk 52 has holding grooves which extend essentially tangentially in the direction of rotation (arrow 45) of the entrainment disk 37, as shown in FIG. 2. Through this construction, easy insertion is provided of workpieces 1, 2, 3 into the holding grooves 42 of the lower disk 53. The two disks 52 and 53 may also be placed directly on top of each other, as shown in FIG. 4. Finally, for short workpieces (FIG. 5), only one disk may be used as entrainment disk 37. With it, the holding grooves 42 may be such that the upper region with the tangentially directed taper outward of the holding grooves turns in a continuous manner into a semicircular holding groove.

As shown in FIG. 1, between holding head 19 of each workpiece holding unit 18 and the associate guide sleeve 21, there is a package of cup springs 54 which is supported via an axial bearing 55 on the holding head 19. Under the action of the package of cup springs 54, each workpiece 1, 2, 3 is continuously pressed with its head 40 during machining against the upper surface 39 of the counter-ring 38 so that the head 40 can also follow the path of the inclined surface 46 of the upper surface 39 of the counter-ring 38 while machining workpiece 1, 2, 3.

Since machining of workpieces 1, 2, 3 regularly takes place only along a partial periphery of counter-ring 38, the supports of rotary table 5 are loaded relatively unilaterally. In order to balance this load, support shaft 12 of rotary table 5 is provided with a spring-elastic supported reset device 56 which is mounted on frame 4. The reset device, which is shown only schematically in FIG. 1, acts on a stub 57 of support shaft 12 which is rigidly mounted in housing 11 and hence does not rotate. The reset device 56 acts directly above milling cutter 6 on support shaft 12 of rotary table 5 and its line of action is approximately directed toward the center of the machining range of counter-ring 38. FIG. 2 shows a top view of reset device (in phantom).

Figure 6:
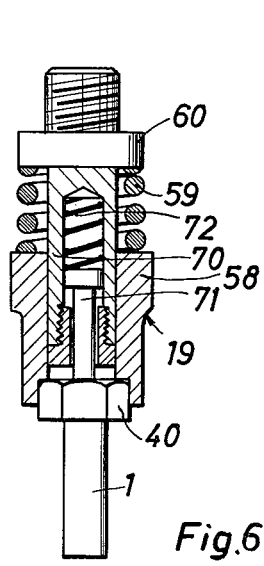
FIGS. 6, 7, 8 shows vertical sections through the holding head of the workpiece holding units for holding screwbolts with an external hexagon, a screwbolt with an internal hexagon or a slotted screwbolt.

FIGS. 6 through 9 shows various designs for the holding head 19. FIG. 6 shows a holding head 19 for screw bolts with a hexagon head 40. A commercial socket wrench head is used which is under the action of a spring 59. The latter is supported on shoulder 60 of a screw element. The socket wrench head 58 is secured by means of a pin seated in a slotted hole of screw element 70. Inside the screw element 70, a plunger 71 is held under the action of a spring 72 which is compressed by plunger 71 when seating the head 40 of a workpiece 1 in the socket wrench head 58. The compressed spring 72 and plunger 71 act as ejectors as soon as the workpiece 1 reaches the take-away position 44 with the head being disengaged from the guide which holds it during machining.

Figure 7:
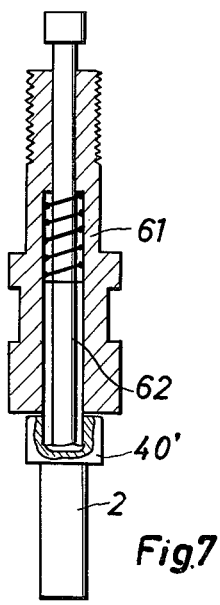

In the embodiment of FIG. 7 which is provided for a screw with a hexagon socket head 40', a spring-loaded hexagonal bolt 62 is guided inside a screw-in part 61 which may be provided with a square key. This bolt 62 is engaged and form linked to the the inside hexagon of head 40' of workpiece 2; under the action of the spring, it acts as ejector when machining on workpiece 2 is completed.

Figure 8:
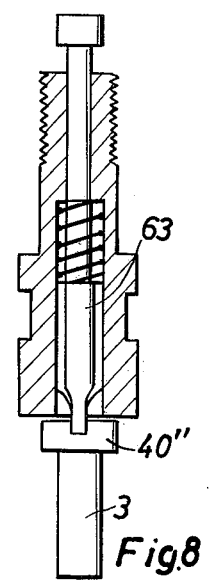

A corresponding design is used in the embodiment of FIG. 8 which provides for slotted head screws with heads 40''. Inside a screw insert there is a spring-loaded screw driver which also acts as ejector.

The counter-ring inside surface, used for guiding the shanks of workpieces 1, 2 and 3, beyond the shank length of the workpieces, acts as counter support for the workpieces 1, 2, 3 (see FIG. 3).

In a particularly advantageous embodiment, shown by broken lines in FIGS. 1 and 2, the upper surface 39 of counter-ring 38 is parallel to the base surface 64 of counter-ring 38. This base surface contacts the surface 65 of frame 4. The base surface 64 of counter-ring 38, through intermediate layers (not shown) makes an angle with the surface 65 of frame 4; the upper surface 39 constitutes the inclined plane 46 of counter-ring 38. The intermediate layers are preferably disks in the vicinity of the mounting screws 69. The rear side 66 of counter-ring 38, to center it, is guided by columns 67 which are rigidly connected to frame 4 by screws. The columns 67 are at an angle of 90°, with respect to the rotation shaft of the device, in such a way, that further centering for counter-ring 38 can be dispensed with. In this embodiment, the feed and take-away cams 47 and 48 are not necessary. To guide the heads of workpieces 1, 2, 3, the upper surface 39 of counter-ring 38 has a raised edge strip 68 which extends along the entire circumference of counter-ring 38. In this case, the surface of edge strip 68 constitutes the inclined plane 46 for automatic delivery of workpieces 1, 2, 3 to milling cutter 6.

FIG. 9 shows a holding head 19' for flat head bolts 73 with circular shank. The holding head 19' comprises a housing 74 which is moved up and down by the cam control (drum 22 and rollers 23), a collet 76 loaded by a spring 75, a thrust bearing 77 and a plunger 78 which can be moved up and down (drive mechanism not shown). The spring is supported by the inside bore 79 of housing 74 and by ring 80 which encircles the shank of the collet 76 and is secured by a circlip lock ring 81. The collet 76 has a lengthwise slot 82 and is thus elastic so that when shifting the collet 76 from its conical seal 83, it opens to receive an ejection member 73; when withdrawing the collet 76 to seat 83, the collet 76 closes. Opening and closing are controlled by plunger 78 and its drive mechanism.

By means of the holding head 19', shown in FIG. 9, not only the ejection member 73, but all rotational symmetric components which require force-linked clamping can be clamped.

Without further analysis, the foregoing will fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning of range of equivalence of the following claims.

What is claimed is:

1. An arrangement for chamfering or pointing of cylindrical workpieces having a head or shoulder and a shank comprising: a cutting tool; a rotary table mounted on a support shaft coaxial with said cutting tool; drive means including a drive shaft for rotating said rotary table on said support shaft; workpiece holding units with holding elements for receiving the workpieces, said units being mounted on spindles for rotation on said rotary table, said elements having axes parallel with an axis of said rotary table; a frame; said workpiece holding units being mounted in said frame on said rotary table; ring means fixed to said frame for guiding the workpieces; an entrainment disk rotatable with the rotary table and having holding grooves for the shanks of the workpieces; said ring means having an upper surface for guiding the heads of the workpieces, the shanks of the workpieces being guided by said holding grooves of said entrainment disk along an inside surface of said ring means, said upper surface of said ring means extending between feed and removal positions for said workpieces and having at least one plane inclined in a direction of motion of the workpieces when carried by said rotary table for automatic delivery of the workpieces to said cutting tool; said upper surface of said ring means having an adjacently connecting planar surface for supporting said workpieces horizontally during final cutting; an independent auxiliary drive means for adjustably driving said spindles comprising first drive gears mounted on said drive shaft, said first drive gears being mechanically connected to second drive gears mounted on said support shaft, said second drive gears being in turn operatively connected to pinions mounted on said holding unit spindles, whereby said spindles may be driven by said auxiliary drive means at a preselected rotational speed independently of the rotational speed of the rotary table effected by said drive shaft to adjust the cutting speed to an optimum value; and means for pressing the workpieces against the upper surface of the ring means whereby the simultaneous pressing of said workpieces against the upper surface of the ring means, the rolling of the shanks against the inside periphery of said ring means, and the rotation of said workpieces by said auxiliary drive means reduces frictional wear during movement of the workpieces along said ring means by the rotation of the table.

2. The arrangement as defined in claim 1 including a feed cam on the upper surface of said ring means in a feed position of said workpieces, said feed cam having an oblique surface declining in the direction of the inclined plane of said ring means.

3. The arrangement as defined in claim 1 including removal cam means on said upper surface of said ring means in a removal position of said workpieces, said removal cam having an oblique surface rising in the direction of motion of said workpieces from said upper surface of said ring means.

4. The arrangement as defined in claim 1 wherein said holding grooves of said entrainment disk have in the upper region thereof milling cuts extending at the upper side of said entrainment disk tangentially in the direction of rotation of said entrainment disk, said holding grooves having a semi-circular shape, said milling cuts continuously turning into the semi-circular shape of said grooves in the lower region of said entrainment disk.

5. The arrangement as defined in claim 4 wherein said entrainment disk comprises two disks one above the other, the lower disk having the semi-circular shaped holding grooves and the upper disk having holding grooves with tangential milling cuts in the direction of rotation of the disk.

6. The arrangement as defined in claim 1 including; spring-elastic reset means engaging said support shaft in a position above said cutting tool, said reset means having a line of action directed substantially towards the center of a machining region of said ring means.

7. The arrangement as defined in claim 1 wherein said ring means has a base surface in contact with a surface of said frame; intermediate layer means; said base surface of said ring means forming through said intermediate layer means an angle with said surface of said frame, said upper surface of said ring means forming an inclined plane on said ring means.

8. The arrangement as defined in claim 7 including column means connected to said frame, the rearside of said ring means being guided by said column means for centering said ring means.

9. The arrangement as defined in claim 1 wherein said upper surface of said ring means has a raised edge strip forming a guide surface for said workpieces.

10. The arrangement as defined in claim 1 including a feed cam on the upper surface of said ring means in a feed position of said workpieces, said feed cam having an oblique surface declining in the direction of the inclined plane of said ring means; removal cam means on said upper surface of said ring means in a removal position of said workpieces, said removal cam having an oblique surface rising in the direction of motion of said workpieces from said upper surface of said ring means, said holding grooves of said entrainment disk having in the upper region thereof milling cuts extending at the upper side of said entrainment disk tangentially in the direction of rotation of said entrainment disk, said holding grooves having a semicircular shape, said milling cuts continuously turning into the semi-circular shape of said grooves in the lower region of said entrainment disk; said entrainment disk comprising two disks one above the other, the lower disk have the semi-circular shaped holding grooves and the upper disk have holding grooves with tangential milling cuts in the direction of rotation of the disk; spring-elastic reset means engaging said support shaft in a position above said cutting tool, said reset means having a line of action directed substantially towards the center of a machining region of said ring means; said ring means having a base surface in contact with a surface of said frame; intermediate layer means; said base surface of said ring means forming through said intermediate layer means an angle with said surface of said frame, said upper surface of said ring means forming an incline plane on said ring means; column means connected to said frame; the rear side of said ring means being guided by said column means for centering said ring means; said upper surface of said ring means having a raised edge strip forming a guide surface for said workpieces.

* * * * *